(12) United States Patent  
Idani et al.

(10) Patent No.: US 8,495,385 B2  
(45) Date of Patent: Jul. 23, 2013

(54) ADAPTER FOR PORTABLE STORAGE MEDIUM AND METHOD OF DISABLING DATA ACCESS

(75) Inventors: Shigehiro Idani, Kawasaki (JP); Toshihiro Sonoda, Kawasaki (JP); Kouichi Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/051,321

(22) Filed: Mar. 18, 2011

(65) Prior Publication Data

US 2011/0231672 A1    Sep. 22, 2011

(30) Foreign Application Priority Data

Mar. 19, 2010   (JP) .................................. 2010-64173

(51) Int. Cl.
    *G06F 21/00*   (2006.01)
(52) U.S. Cl.
    USPC ........... 713/189; 713/190; 713/191; 713/192; 713/193
(58) Field of Classification Search
    USPC ........................................................ 713/189
    See application file for complete search history.

(56) References Cited

U.S. PATENT DOCUMENTS

| 2006/0130156 A1 | 6/2006 | Ng et al. |
| 2007/0033320 A1 | 2/2007 | Wu et al. |
| 2008/0178009 A1 | 7/2008 | Funahashi |
| 2010/0235575 A1 | 9/2010 | Yasaki et al. |

FOREIGN PATENT DOCUMENTS

| EP | 2-028-603 | * | 8/2007 |
| EP | 2 028 603 A1 | | 2/2009 |
| JP | 2006-338583 | | 12/2006 |
| JP | 2010-238216 | | 10/2010 |
| WO | 2005/001673 A1 | | 1/2005 |
| WO | WO 2005/001673 | * | 6/2005 |

OTHER PUBLICATIONS

Office Action issued by the European Patent Office on Jul. 4, 2012 in the corresponding European patent application No. 11158730.9.
Office Action issued by the European Patent Office on Oct. 7, 2011 in the corresponding European patent application No. 11158730.9.

* cited by examiner

*Primary Examiner* — Longbit Chai
(74) *Attorney, Agent, or Firm* — Staas & Halsey LLP

(57) ABSTRACT

A portable storage medium adapter, which is connected to a computer to store data received from the computer in a portable storage medium, includes a holding part that detachably holds the portable storage medium, a detecting part that detects an unloading operation of the portable storage medium by a user, and a disablement executing part that executes a disabling process to disable external access to the data stored in the portable storage medium at a time when the unloading operation is detected in the detecting part.

6 Claims, 15 Drawing Sheets

FIG. 8A

| BYTE | 0 | 1 | 2 | 3~6 |
|---|---|---|---|---|
| ITEM | FACTOR CAUSING ACCESS DISABLEMENT | | ACCESS DISABLING METHOD | THRESHOLD VALUE |

FIG. 8B

| BIT | ITEM |
|---|---|
| 0 | ELAPSED TIME |
| 1 | REMAINING AMOUNT OF POWER IN BATTERY |
| 2 | COUNT OF FAILURES OF AUTHENTICATION OF APPARATUS |
| 3 | COUNT OF FAILURES OF AUTHENTICATION OF USER |
| 4 | COUNT OF FAILURES OF AUTHENTICATION OF MANAGER |
| 5 | TIME SINCE START OF CONNECTION BEFORE AUTHENTICATION |
| 6 | COMMAND ISSUED BY COMMAND |
| 7 | ELAPSED TIME SINCE OPENING |
| 8 | UNLOADING OF SD CARD |
| 9~15 | SPARE |

FIG. 8C

| BIT | ACCESS DISABLING METHOD |
|---|---|
| 0 | PARTIAL ERASING |
| 1 | LOCK OF FLASH MEMORY |
| 2 | ERASING OF ENCRYPTION KEY |
| 3 | ERASING BY OVERWRITING |
| 4 | FUNCTIONAL RESTRICTION |
| 5~7 | SPARE |

FIG. 9

| RULE NUMBER | FACTOR | ACCESS DISABLING METHOD | THRESHOLD VALUE (EXAMPLE) |
|---|---|---|---|
| 1 | ELAPSED TIME | ERASING OF ENCRYPTION KEY + ERASING BY OVERWRITING | 120 HOURS |
| 2 | ELAPSED TIME | ERASING BY OVERWRITING + LOCK | 144 HOURS |
| 3 | UNLOADING OF SD CARD | ERASING OF ENCRYPTION KEY + ERASING BY OVERWRITING | ONCE |
| 4 | ELAPSED TIME | ERASING ENCRYPTION KEY | 100 HOURS |

FIG. 13

| COMMAND (READ/WRITE) | FIRST SECTOR | SIZE | READOUT-WRITING DATA AREA |

ADAPTER FOR PORTABLE STORAGE MEDIUM AND METHOD OF DISABLING DATA ACCESS

CROSS-REFERENCE TO RELATED APPLICATIONS

This application is based upon and claims the benefit of priority of the prior Japanese Patent Application No. 2010-64173, filed on Mar. 19, 2010, the entire contents of which are incorporated herein by reference.

FIELD

The embodiments discussed herein are related to an adapter for a portable storage medium (hereinafter referred to as a portable storage medium adapter) and a method of disabling data access.

BACKGROUND

Although portable storage media such as universal serial bus (hereinafter denoted as USB) memories excel in portability, etc., they have the risk of information leak caused by the portable storage media that are lost or stolen. In order to avoid the above risk, the portable storage media are provided with, for example, a function of adding a lock function to an area where the data in the USB memories is stored and not canceling the lock function if authentication using passwords fails, a function of deleting data files upon occurrences of input errors of passwords, or a function of encrypting the entire area where the data in the USB memories is stored without the lock function and preventing the decryption if authentication using passwords fails.

In addition, for example, a technology disclosed in Japanese Lain-open Patent Publication No. 2006-338583 emerges as a computer-terminal storage medium capable of suppressing unauthorized use of data.

SUMMARY

A portable storage medium adapter connected to a computer to store data received from the computer in a portable storage medium includes, a holding part that detachably holds the portable storage medium, a detecting part that detects an unloading operation of the portable storage medium by a user, and a disablement executing part that executes a disabling process to disable external access to the data stored in the portable storage medium at a time when the unloading operation is detected in the detecting part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8A illustrates a format of an access disabling policy, FIG. 8B illustrates examples of the values of factors causing the access disablement, and FIG. 8C illustrates examples of the values of access disabling methods;

FIG. 9 illustrates exemplary access disabling policies;

FIG. 13 illustrates a command issued to a file system when an OS of an information processing apparatus reads out or writes data described in the file system;

DESCRIPTION OF EMBODIMENTS

Figure 1:
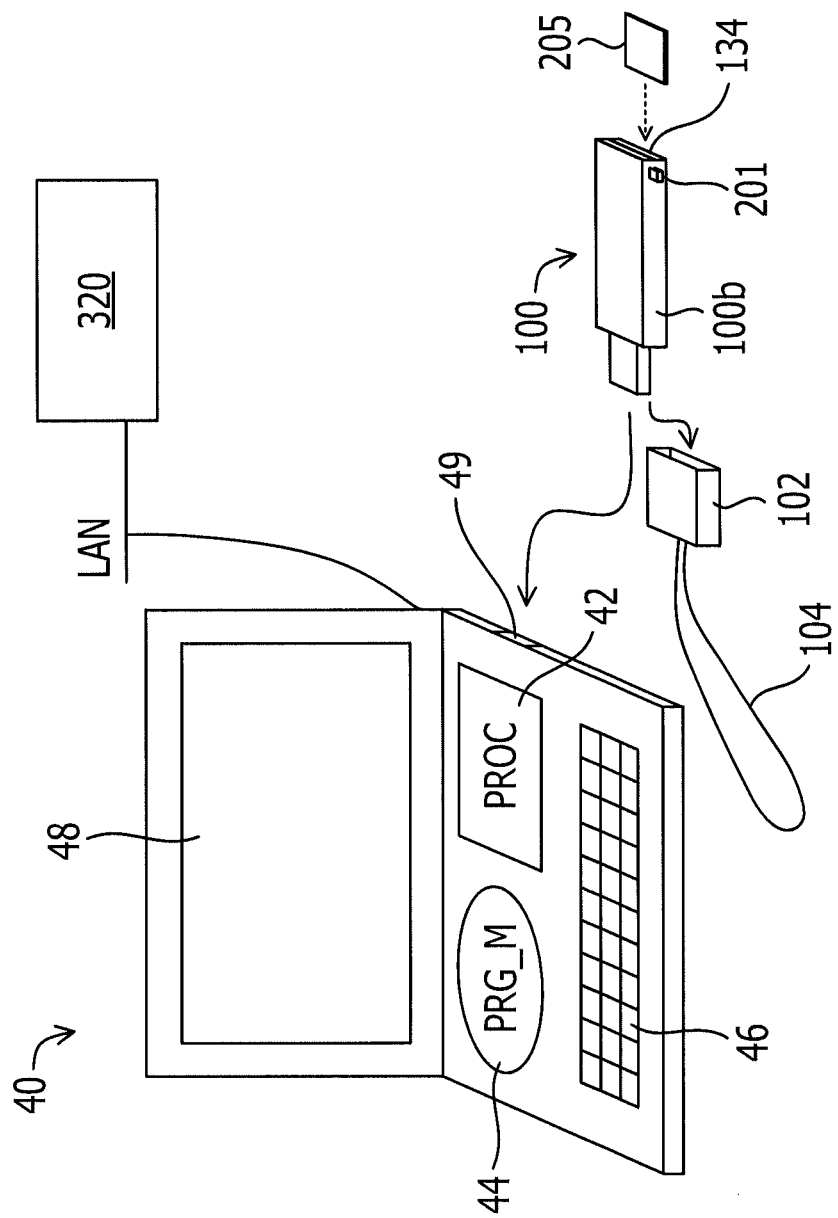
FIG. 1 is a perspective view illustrating an information processing apparatus and a USB adapter according to a first embodiment of the present invention.

A portable storage medium adapter and a method of disabling data access according to a first embodiment will now be described with reference to FIGS. 1 to 9. The same reference numerals are used to identify the same components in the respective drawings.

FIG. 1 is a perspective view illustrating an information processing apparatus 40 serving as a host apparatus, such as a personal computer, and a USB adapter 100 serving as a portable storage medium adapter for connecting a portable storage medium to an information processing apparatus. The USB adapter 100 is connected to a USB port 49 of the information processing apparatus 40. Referring to FIG. 1, the information processing apparatus 40 is connected to a server 320 via, for example, a local area network (LAN). However, the information processing apparatus 40 may not be connected to the server 320.

The information processing apparatus 40 includes a processor 42, a storage unit 44 (for example, a hard disk), an input unit 46 such as a keyboard, a display unit 48 such as a liquid crystal display, and the USB port (connection terminal) 49.

Figure 2:
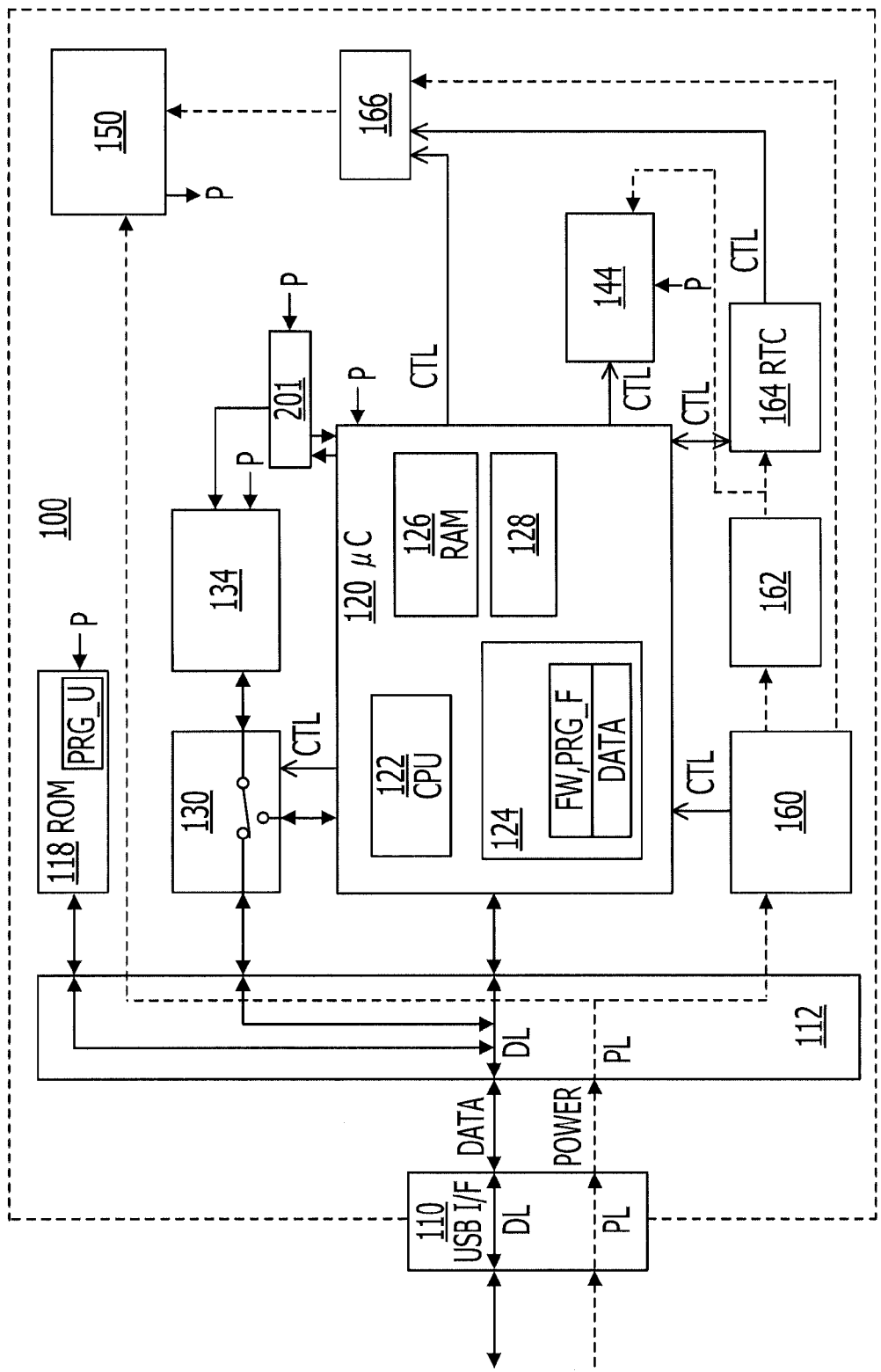
FIG. 2 is a block diagram schematically illustrating an exemplary configuration of the USB adapter according to the first embodiment.

FIG. 2 is a block diagram schematically illustrating an exemplary configuration of the USB adapter 100. Referring to FIG. 2, the USB adapter 100 includes a USB interface (I/F) 110, a USB hub 112, a read only memory (ROM) 118, a microcomputer (µC) 120, a hub switch 130, a card slot 134, and an indicator 144, such as a light emitting diode (LED). A Secure Digital (SD) card 205 functioning as a portable storage medium can be loaded and unloaded from the card slot 134. The card slot 134 functions as a holding part holding the SD card and a release part releasing the holding of the SD card. The USB adapter 100 further includes a main power-supply circuit 150, a battery and charging circuit 160, an auxiliary power-supply circuit 162, a real-time clock (RTC) 164 for display or monitoring of time, and a switch 166.

A data file of a user, received from the information processing apparatus 40, is stored in the SD card 205 held (loaded) in the card slot 134. Upon pressing of a loading-unloading switch 201 functioning as a detection part by the user, the card slot 134 discharges the loaded SD card 205 (releases the holding state). The loading-unloading switch 201 is provided in part of a main body 100*b* of the USB adapter 100, as illustrated in FIG. 1.

The USB interface 110 includes a power supply line or a pin PL (a broken line with arrows) and a data line or a pin DL (a solid line with two-way arrows). The USB hub 112 is connected to the USB interface 110 and includes a branch power supply line PL (a broken line with arrows) and a branch data line DL (a solid line with two-way arrows).

The indicator 144 is controlled by the microcomputer 120 (a central processing unit (CPU) 122) to display, for example, the operation state of the USB adapter 100 and the remaining time before the microcomputer 120 performs the first or subsequent access disabling or protecting process.

The microcomputer 120 includes the CPU 122, a random access memory (RAM) 126, an internal flash memory 124, and a power-supply control circuit 128. The internal flash memory 124 is capable of storing a firmware program (FW) used by the CPU 122 and data (identification information for authentication, an encryption key for the data file or the like, an access disabling policy, a log, and state information).

A USB memory utility program (PRG_U) for the user, used by the information processing apparatus 40 (the processor 42), is stored in the ROM 118. A USB memory utility (for management, authentication, policy evaluation, etc.) program (PRG_F) used by the CPU 122 in the microcomputer 120 is stored in the flash memory 124.

The USB adapter 100 is connected to the USB port 49 of the information processing apparatus 40 via the USB interface 110 (DL). The ROM 118 and the microcomputer 120 are connected to the USB interface 110 via the USB hub (DL) 112. The microcomputer 120 is connected to the card slot 134 and the SD card 205 loaded in the card slot 134 via the hub switch (DL) 130 and is connected to the battery and charging circuit 160, the real-time clock 164, and the indicator 144. The card slot 134 and the SD card 205 are connected to the USB interface 110 or the microcomputer 120 via the hub switch 130 and the USB hub (DL) 112.

The battery and charging circuit 160 receives power from the USB port 49 of the information processing apparatus 40 via the USB hub 112 and the USB interface 110 (PL) to charge a rechargeable battery, to supply the power to the auxiliary power-supply circuit 162, and to supply the power to the main power-supply circuit 150 via the switch 166. The battery and charging circuit 160 are connected to the auxiliary power-supply circuit 162. The main power-supply circuit 150 also receives power from the USB port 49 of the information processing apparatus 40 via the USB hub 112 and the USB interface 110 (PL). The main power-supply circuit 150 is subjected to on-off control with the switch 166 to receive the power from the battery and charging circuit 160 when the USB adapter 100 is not connected to the information processing apparatus 40. The switch 166 is controlled by the microcomputer 120 and the real-time clock 164.

The main power-supply circuit 150 supplies power to the ROM 118, the microcomputer 120, the card slot 134, and the indicator 144 when the USB interface 110 is connected to the USB port 49 of the information processing apparatus 40 or when the main power-supply circuit 150 is turned on with the switch 166 to receive the power from the battery and charging circuit 160. The auxiliary power-supply circuit 162 supplies power to the real-time clock 164 and the switch 166. The indicator 144 may receive the power from the auxiliary power-supply circuit 162, instead of the main power-supply circuit 150.

The processor 42 of the information processing apparatus 40 can operate in accordance with a program (PRG_M) stored in the storage unit 44 or the program (PRG_U) stored in the USB adapter 100 (the ROM 118). The utility program (PRG_M) for a manager and/or the utility program (PRG_U) for the user are stored in the storage unit 44.

The utility program (PRG_U) for the user is read out from the ROM 118 in the USB adapter 100 to be stored in the storage unit 44 upon connection of the USB adapter 100 to the information processing apparatus 40. The utility program for the user includes, for example, management programs for authentication of the user, for authentication of the information processing apparatus, and for building a file system of the USB adapter 100 (the SD card 205).

The utility program (PRG_M) for the manager includes, for example, management programs for authentication of the manager, for authentication of the information processing apparatus, for setting (adding, updating, or deleting) the information processing apparatus to which access is permitted, for setting (adding, updating, or deleting) the access disabling policy, and for building the file system of the USB adapter 100 (the SD card 205). The access disabling policy may include identification information and/or parameters of rules or conditions and disabling methods. The input unit 46 includes, for example, a keyboard and/or a pointing device.

Figure 3:
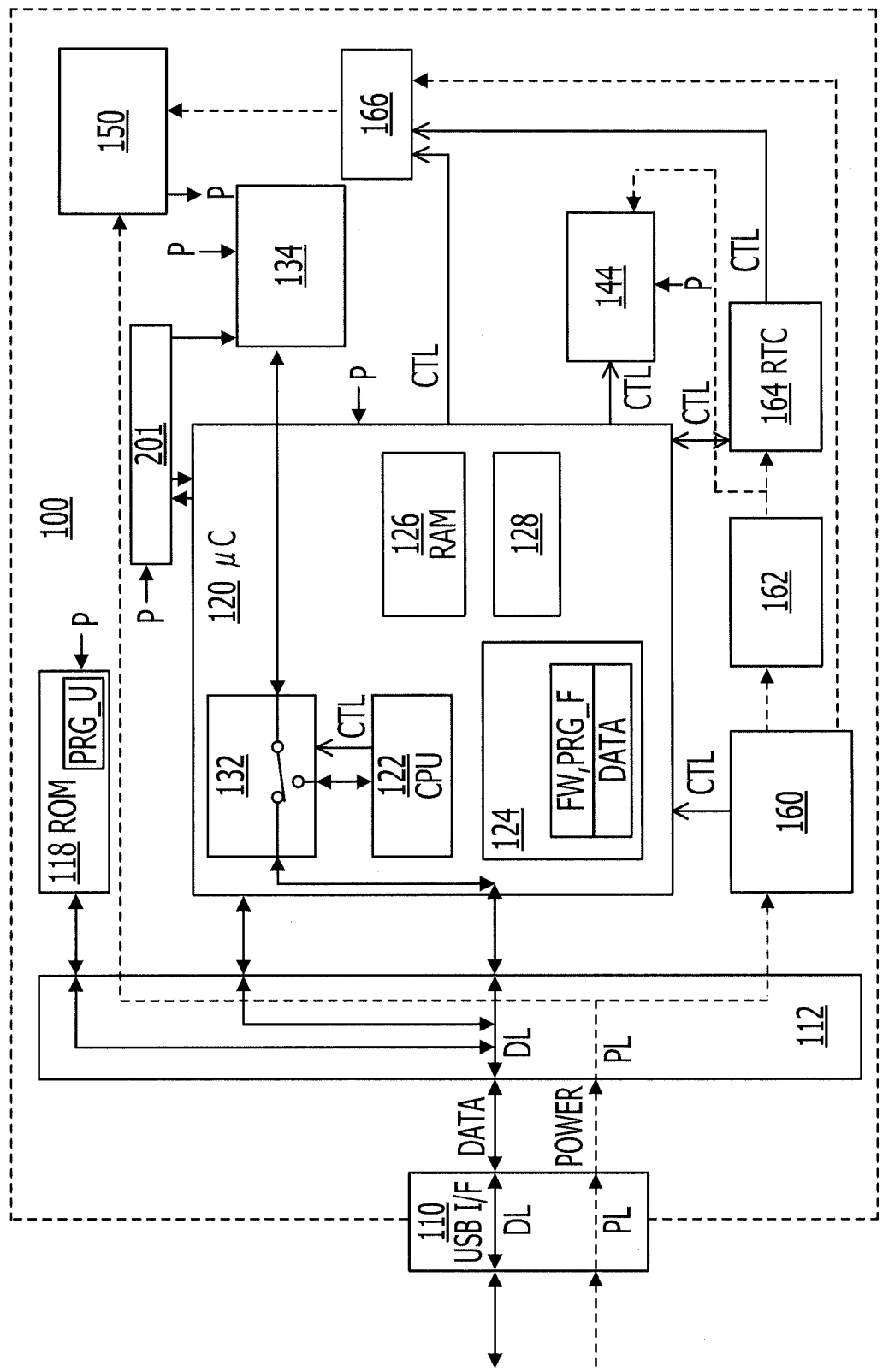
FIG. 3 is a block diagram schematically illustrating another exemplary configuration of the USB adapter according to the first embodiment.

FIG. 3 is a block diagram schematically illustrating another exemplary configuration or arrangement of the USB adapter 100 according to the first embodiment. Referring to FIG. 3, the function of a hub switch 132 provided in the microcomputer 120 is used, instead of the hub switch 130 in FIG. 2. The remaining configuration or arrangement of the USB adapter 100 illustrated in FIG. 3 and the operation thereof are similar to the ones in FIG. 2.

Figure 4:
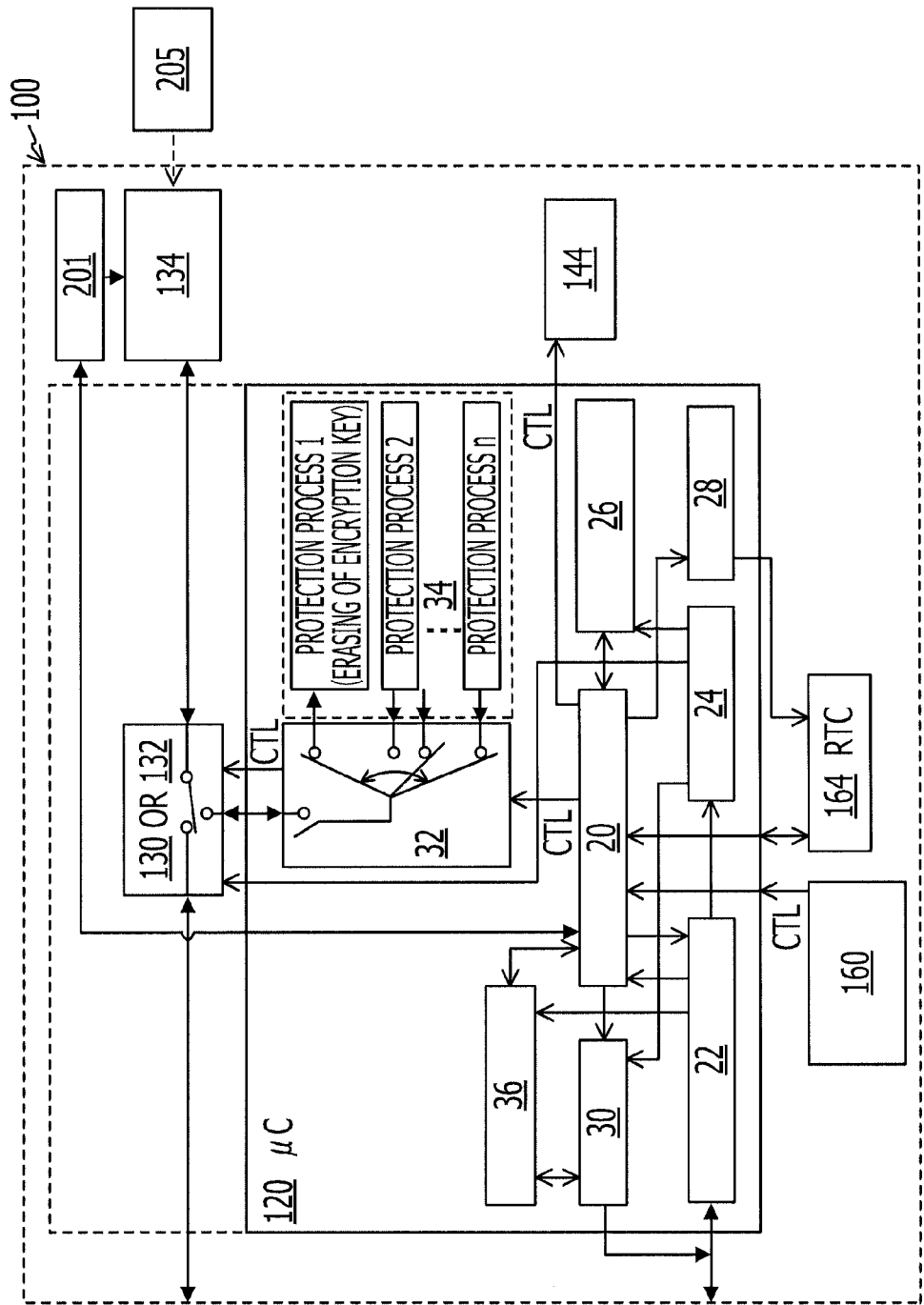
FIG. 4 is a block diagram for describing the functions of a microcomputer in the USB adapter according to the first embodiment.

FIG. 4 is a block diagram illustrating an exemplary configuration or arrangement of the main functional parts in each of the microcomputers 120 in FIG. 2 and FIG. 3.

As illustrated in FIG. 4, the microcomputer 120 includes a policy evaluator or determiner 20, an authentication processor 22, a command processor 24, an access disabling policy storage part (setting information storage part) 26, a time manager 28, and a state output part 30 as functional parts or circuit parts. The microcomputer 120 also includes a selector or controller 32 for selecting or controlling an access disabling method, an access disablement processor (executer) or a data protection processor 34, and a state information and log (record) storage part (state information holder) 36 as other functional parts or circuit parts. The access disablement processor 34 functions as a disablement executer. These functions are realized (installed) by the firmware FW or the program (PRG_F) in the flash memory 124. The authentication processor 22 includes an authentication information storage part. The authentication information storage part in the authentication processor 22, the access disabling policy storage part 26, and the state information and log storage part 36 are areas in the flash memory 124 in the microcomputer 120. The firmware FW, the program PRG_F, and the data in the flash memory 124 are not erased even if the power in the battery and charging circuit 160 runs out.

Erasing of encryption key in protection process 1 in the access disablement processor 34 is a process of erasing multiple encryption keys stored in the flash memory 124. The multiple encryption keys are created upon storage of the data file that is encrypted in the SD card 205 to be stored in the flash memory 124.

The policy evaluator 20 determines whether the SD card 205 loaded in the USB adapter 100 is to be protected, that is, whether access to the data file in the SD card 205 is to be disabled in each protection level in accordance with each access disabling policy (the rule or condition and the disabling method of the access disabling policy) stored in the access disabling policy storage part (the part where the rules or conditions and the disabling methods are stored) 26 on the basis of the current date and time and the log and state information. If the policy evaluator 20 determines that the SD card 205 is to be protected, the policy evaluator 20 controls the selector 32 so as to select an access disabling method or a protection method in order to disable access to the data in the SD card 205. For example, erasing of an encryption key, erasing of data, or restriction of the function is performed to disable access to the data in the SD card 205.

The authentication processor 22 sets the identification information for authentication to authenticate the information processing apparatus, the manager, and the user to which access is permitted on the basis of identification information for authentication set by the manager. As a result, connection of the USB adapter 100 to the authorized information processing apparatus and use of the USB adapter 100 by the authorized user or manager are detected. The authentication processor 22 records, for example, the current date and time, the date and time when an event such as authentication occurs, the date and time when the USB adapter 100 is connected to the server 320 via the information processing apparatus, the date and time when the USB adapter 100 is opened and/or closed (when a cap of the USB adapter 100 is opened and/or closed or when a strap of the USB adapter 100 is mounted and/or unmounted), the count of continuous failures of authentication of the user, the count of continuous failures of authentication of the manager (privileged user), the count of continuous failures of authentication of the information processing apparatus 40, the remaining amount of power in the battery, and the state information in the state information and log storage part 36 as the log or state information.

The command processor 24 executes a command received from the information processing apparatus 40. The command processor 24 stores the access disabling policy (the identification information and/or parameter indicating the rule or condition and the disabling method of the access disabling policy) set by the manager in the access disabling policy storage part 26 in accordance with the command. The command processor 24 controls the hub switch 130 or 132 in accordance with the command. The command processor 24 causes the state output part 30 to output the state information or log to the information processing apparatus 40 via the USB interface 110 and the USB hub 112 in accordance with the command.

The time manager 28 manages, sets, and controls the real-time clock 164 in accordance with a request from the policy evaluator 20 or the result of evaluation by the policy evaluator 20.

The loading-unloading switch 201 notifies the policy evaluator 20 of being pressed by the user. After an access disabling process is performed by the access disablement processor 34 in response to an instruction from the policy evaluator 20, the loading-unloading switch 201 is used to discharge the SD card 205 from the card slot 134 (release the holding state) so that the user can pick up the SD card 205 in response to an instruction from the policy evaluator 20.

Figure 5:
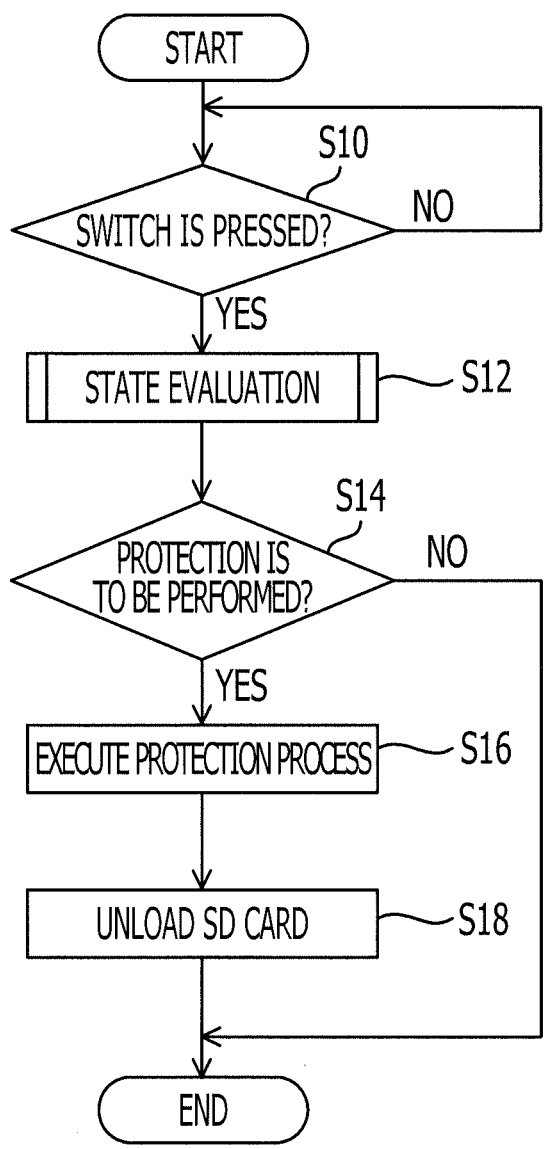
FIG. 5 is a flowchart illustrating an exemplary process in the USB adapter when a loading-unloading switch is pressed.

Exemplary processes in the USB adapter 100 when the loading-unloading switch 201 is pressed will now be described on the basis of FIGS. 5 to 7 and with appropriate reference to other drawings. FIG. 5 is a flowchart illustrating an exemplary process in the USB adapter 100 when the loading-unloading switch 201 is pressed.

Referring to FIG. 5, in S10, it is determined whether the loading-unloading switch 201 is pressed by the user. If the loading-unloading switch 201 is pressed by the user, the pressing of the loading-unloading switch 201 is notified to the policy evaluator 20. In S12, a state evaluation subroutine is executed.

The policy evaluator 20 executes the state evaluation routine in S12. Specifically, the policy evaluator 20 confirms the access disabling policy registered in the access disabling policy storage part 26 to execute a subroutine to confirm whether any access disabling process executed when the SD card 205 is unloaded exists. An exemplary process in FIG. 6 is performed in the subroutine in S12.

Figure 6:
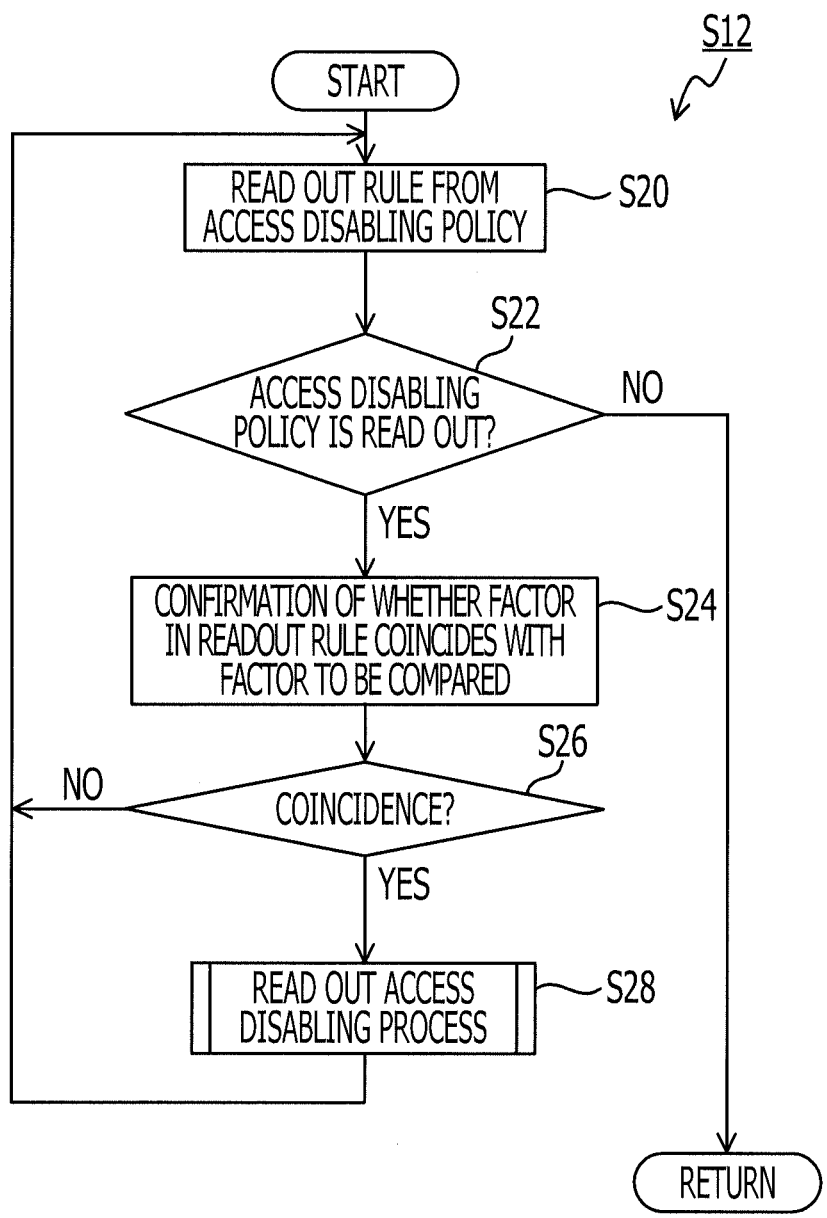
FIG. 6 is a flowchart specifically illustrating a state evaluation step in FIG. 5.

Referring to FIG. 6, in S20, the policy evaluator 20 reads out one access disabling policy from the access disabling policy storage part 26. Each access disabling policy has a format illustrated in FIG. 8A. However, the format in FIG. 8A is only an example. The values of factors causing the access disablement are defined, for example, in a manner illustrated in FIG. 8B and the values of access disabling methods are defined, for example, in a manner illustrated in FIG. 8C.

The format in FIG. 8A includes, for example, a factor causing the disablement of access to data (two bytes), an access disabling method (one byte), and a threshold value (four bytes). The threshold value concerns the factor causing the access disablement. The factors causing the access disablement in FIG. 8B include, for example, the elapsed time since the final authorized access, the remaining amount of power in the battery, the count of failures of authentication of the information processing apparatus, the count of failures of authentication of the user, the count of failures of authentication of the manager (privileged user), the time since connection of the USB adapter 100 to the information processing apparatus 40 is started before the authentication of the information processing apparatus 40 is completed (succeeds), the access disabling command specified by the user, and the unloading of the SD card 205.

FIG. 9 illustrates examples of the access disabling policies based on FIGS. 8A to 8C. Accordingly, the policy evaluator 20 sequentially reads out the access disabling policies in FIG. 9 from the top to the bottom in S20.

Referring to FIG. 6, in S22, the policy evaluator 20 determines whether one access disabling policy is read out. If the determination in S22 is affirmative, in S24, it is determined whether the factor and the threshold value in the readout access disabling policy coincide with (are matched with) the ones when the loading-unloading switch 201 is pressed. If the factor and the threshold value in the readout access disabling policy do not coincide with the ones when the loading-unloading switch 201 is pressed, the determination in S26 is negative and the process goes back to S20. If the factor and the threshold value in the readout access disabling policy coincide with the ones when the loading-unloading switch 201 is pressed, the determination in S26 is affirmative and the process goes to S28.

Since the loading-unloading switch 201 has been pressed in S10 in FIG. 5 in the present embodiment, the determination in S26 is affirmative when the factor causing the access disablement in the access disabling policy is the "unloading of the SD card 205." The determination in S26 can be affirmative by the factor causing the access disablement in another rule before the rule in which the factor causing the access disablement is the "unloading of the SD card 205" is determined.

In S28, the policy evaluator 20 executes a subroutine to read out the access disabling process. Specifically, the policy evaluator 20 executes an exemplary process in FIG. 7.

Figure 7:
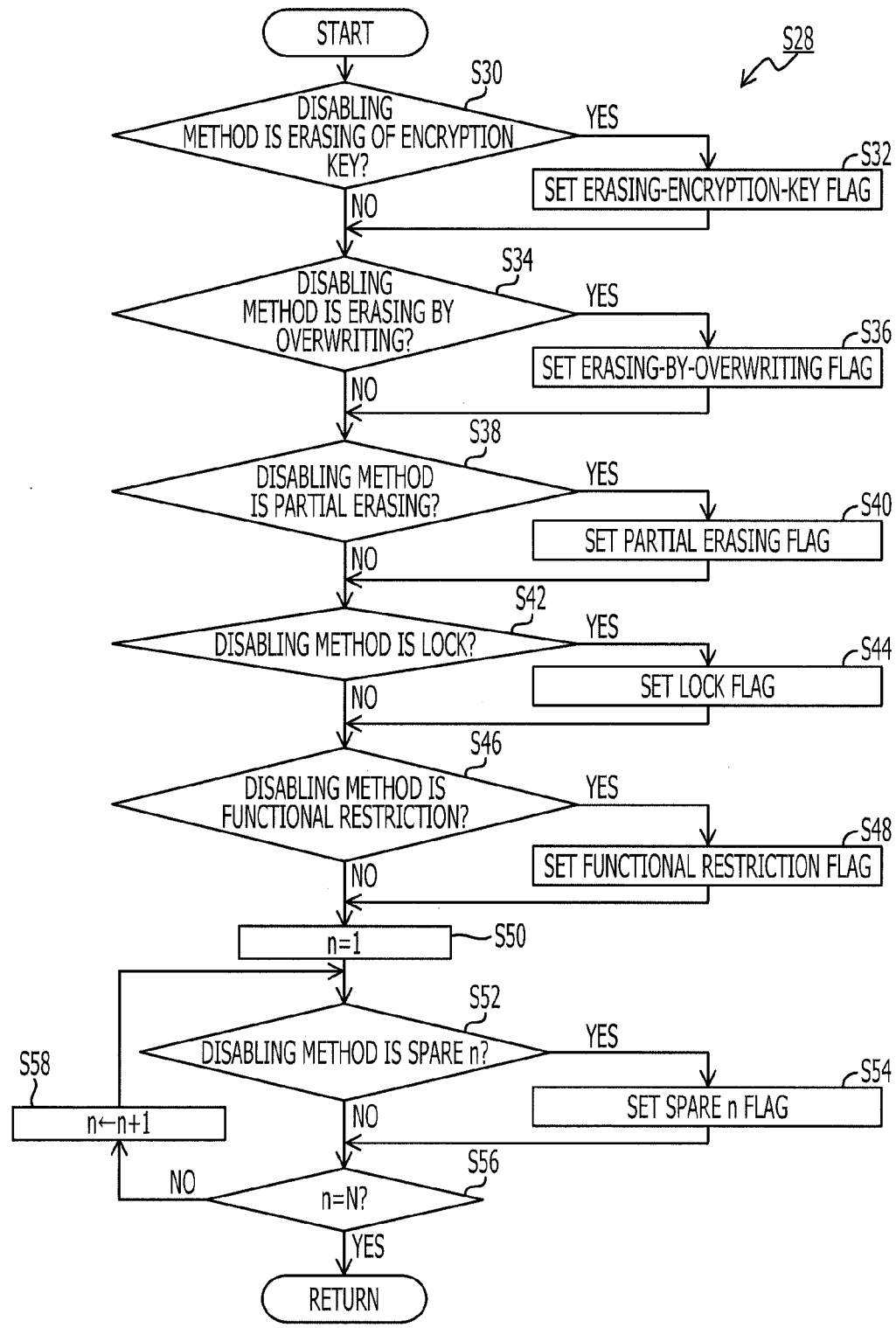
FIG. 7 is a flowchart specifically illustrating readout of an access disabling process in FIG. 6.

Referring to FIG. 7, in S30, the policy evaluator 20 determines whether the access disabling method in the readout access disabling policy is erasing of encryption key. If the determination is affirmative, in S32, the policy evaluator 20 sets an erasing-of-encryption-key flag. The policy evaluator 20 has a two-byte variable as each flag. Accordingly, the policy evaluator 20 sets the bit corresponding to the erasing of encryption key in the two-byte variable in S32.

In S34, the policy evaluator 20 determines whether the access disabling method is erasing by overwriting. If the determination is affirmative, in S36, the policy evaluator 20 sets an erasing-by-overwriting flag. In S38, the policy evaluator 20 determines whether the access disabling method is partial erasing. If the determination is affirmative, in S40, the policy evaluator 20 sets a partial erasing flag. In S42, the policy evaluator 20 determines whether the access disabling method is lock. If the determination is affirmative, in S44, the policy evaluator 20 sets a lock flag. In S46, the policy evaluator 20 determines whether the access disabling method is functional restriction. If the determination is affirmative, in S48, the policy evaluator 20 sets a functional restriction flag.

In S50, the policy evaluator 20 sets a variable n indicating a spare number to one. In S52, the policy evaluator 20 determines whether the access disabling method is Spare n (Spare 1). If the determination is affirmative, in S54, the policy evaluator 20 seta a Spare n flag (Spare 1 flag). In S56, the policy evaluator 20 determines whether the variable n is equal to a maximum value N. If the determination is negative, in S58, the policy evaluator 20 increments the variable n by one and the process goes back to S52. The process repeats the steps S52 to S58 until the variable n is equal to the maximum value N. If the determination in S56 is affirmative, the processing in S28 in FIG. 6 is terminated and the process goes back to S20. Then, the processing and determination in FIG. 6 are repeated until the determination in S22 is negative, that is, until the readout of all the access disabling policies is terminated. If the determination in S22 is negative, the process goes to S14 in FIG. 5.

In S14 in FIG. 5, the policy evaluator 20 determines whether the protection is to be performed, that is, whether a flag is set in any bit in the two-byte variable in the process in FIG. 7. If the determination is negative, the process in FIG. 5 is terminated. If the determination is affirmative, the process goes to S16.

In S16, the policy evaluator 20 sequentially selects the bits, for example, in descending order from the bits for which the flags are set in the two-byte variable via the access disablement processor 34 and sequentially executes the disabling processes corresponding to the bits. The disabling processes make access to the files (data) in the SD card 205 difficult or disable access to the files (data) in the SD card 205. The disabling process having no meaning when it is executed possibly exists depending on the order. In such a case, the access disabling process is skipped.

After the disabling processes are executed in S16, in S18, the policy evaluator 20 notifies the loading-unloading switch 201 of a permission to unload the SD card 205. An unloading operation (discharge operation) of the SD card 205 from the card slot 134 is performed with the loading-unloading switch 201. Then, all the processes in FIGS. 5 to 7 are terminated. Upon termination of the processes, the readout of the data stored in the SD card 205 is made difficult or is disabled.

As described above, according to the first embodiment, the access disablement processor 34 executes the disabling process to disable external access to the data stored in the SD card 205 at a time when the loading-unloading switch 201 receives the unloading operation of the SD card 205 by the user. As a result, since the access to the data stored in the SD card 205 is disabled in the unloading of the SD card 205, it is possible to suppress leakage of the information in the SD card 205. In addition, since the SD card 205 can be replaced with another, if needed, it is possible to improve the user-friendliness of the user, compared with USB memories in related art. In other words, it is possible to enable use of the SD card which the user owns and to increase the life cycle of the product by replacing only the SD card when the SD card reaches its end of life due to restriction of the writing count while maintaining (or improving) the security function of the USB memory (the USB memory incorporating the flash memory or the like).

Since the SD card 205 is not discharged from the card slot 134 before the access disablement processor 34 terminates the execution of the access disabling process in the first embodiment, it is possible to more reliably suppress the leakage of the information.

Although the access disablement processor 34 executes the access disabling process, such as the erasing of the data in the SD card 205, in the first embodiment, the present invention is not limited to this. For example, when the SD card 205 has a high-speed data erasing function, the access disablement processor 34 may only issue a command to cause the SD card 205 to erase the data.

Figure 10:
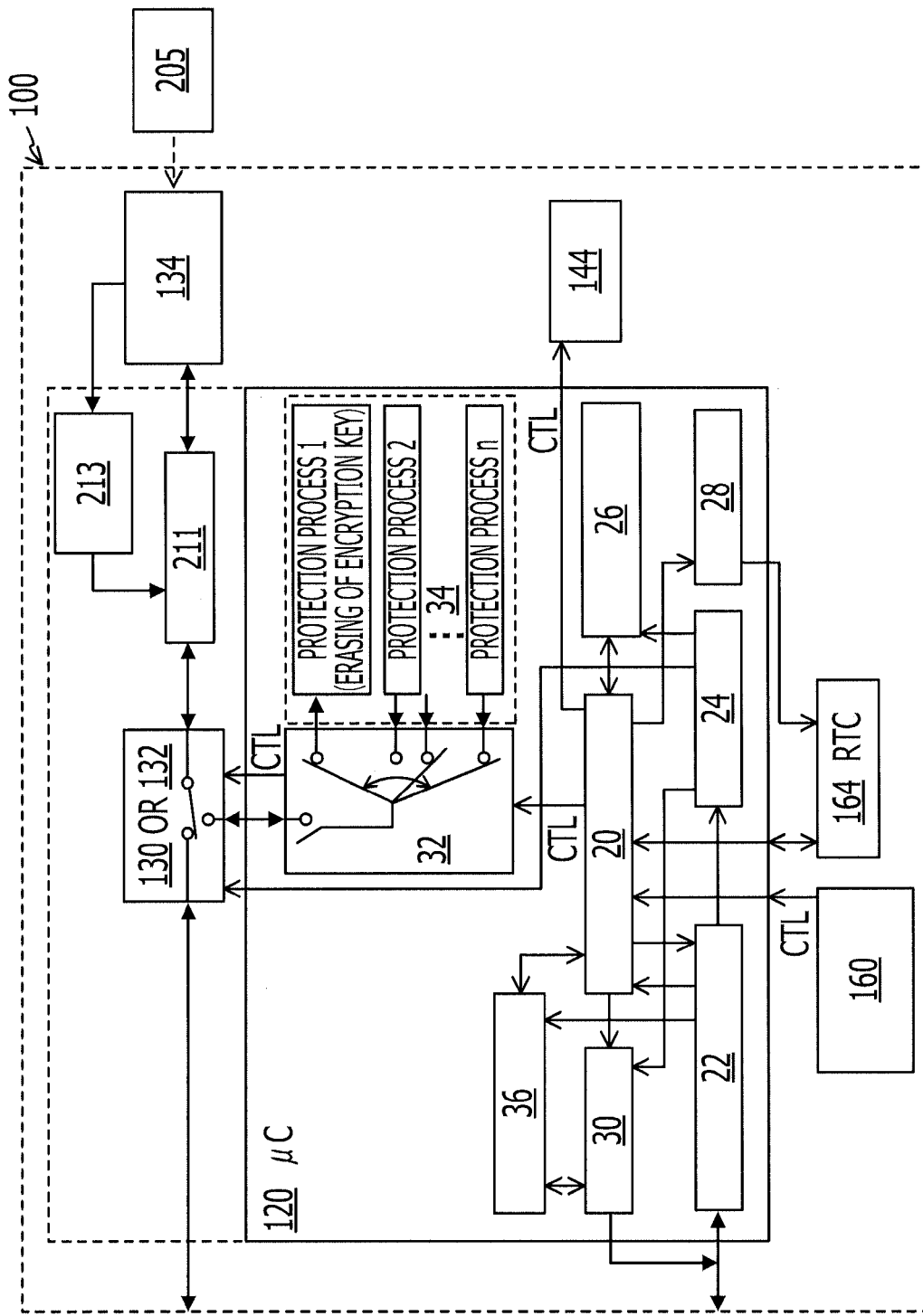
FIG. 10 is a block diagram for describing the functions of a microcomputer in a USB adapter according to a second embodiment of the present invention.

A second embodiment will now be described in detail with reference to FIGS. 10 to 13. The same reference numerals are used in the second embodiment to identify the same components in the first embodiment. A description of such components is omitted herein. In the second embodiment, as illustrated in FIG. 10, the USB adapter 100 includes an encryption module 211 serving as an encryption key creator and a disablement executer and a loading-unloading detection module 213, instead of the loading-unloading switch 201 in the first embodiment (refer to FIG. 4). It is assumed here that the card slot 134 is capable of manual loading and unloading of the SD card 205. However, the card slot 134 is not limited to the manual loading and unloading and the card slot 134 may be capable of the automatic loading and unloading of the SD card 205 (the loading and unloading by using the loading-unloading switch), as in the first embodiment.

The encryption module 211 encrypts data to be written on the SD card 205 connected to the card slot 134 with an encryption key stored in the encryption module 211. In readout of the data, the data is decrypted with the encryption key stored in the encryption module 211. The encryption module 211 also creates and erases ciphers.

The loading-unloading detection module 213 detects a state in which the SD card 205 is loaded (mounted) in the card slot 134 and a state in which the SD card 205 is unloaded (unmounted). The loading-unloading detection module 213 uses, for example, an optical sensor or a contact sensor to detect the loading or unloading of the SD card 205. The loading-unloading detection module 213 requests the encryption module 211 to create an encryption key when the SD card 205 is loaded. The loading-unloading detection module 213 requests the encryption module 211 to erase the encryption key stored in the encryption module 211 when the SD card 205 is unloaded.

Figure 11:
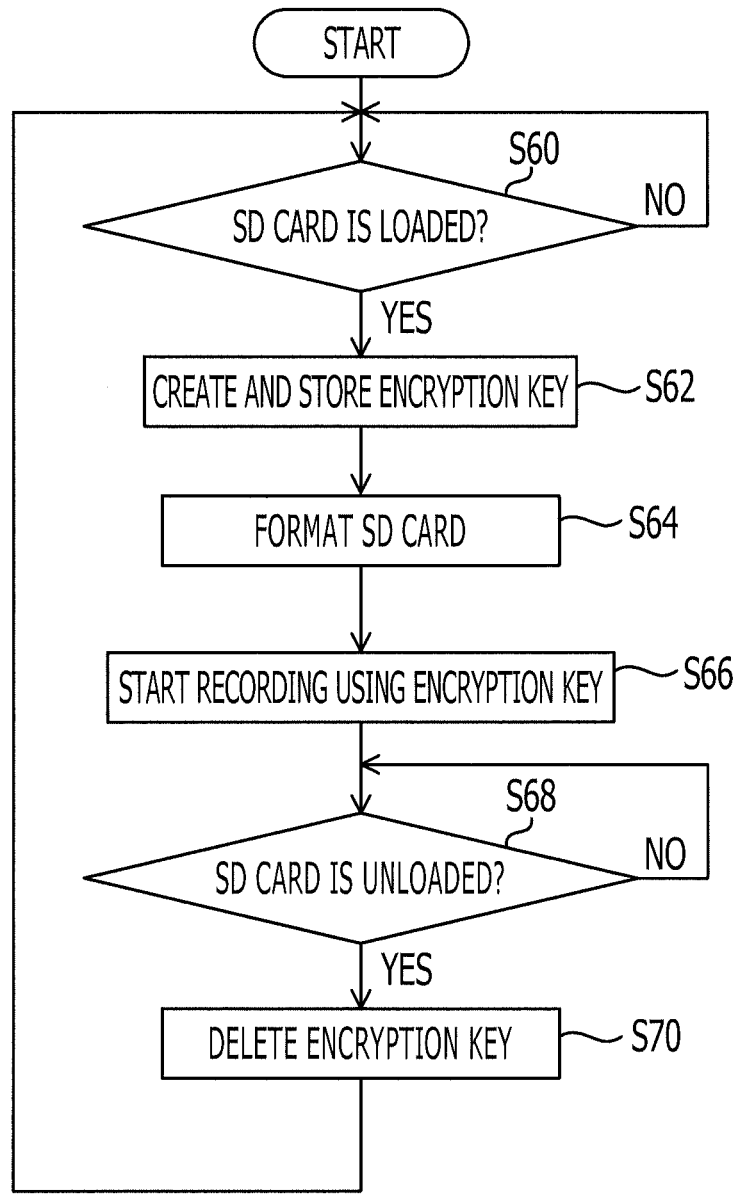
FIG. 11 is a flowchart illustrating an exemplary process performed by an encryption module and a loading-unloading detection module according to the second embodiment.

FIG. 11 is a flowchart illustrating an exemplary process performed by the encryption module 211 and the loading-unloading detection module 213. Referring to FIG. 11, in S60, the loading-unloading detection module 213 determines whether the SD card 205 is loaded in the card slot 134. If the loading-unloading detection module 213 determines that the SD card 205 is loaded in the card slot 134 (affirmative in S60), in S62, the loading-unloading detection module 213 issues a command to create an encryption key to the encryption module 211. The encryption module 211 creates an encryption key in response to the command to create an encryption key and stores the created encryption key.

In S64, formatting of the SD card 205 is performed. At this time, the user confirms the data resulting from decryption of the data stored in the SD card 205 by the encryption module 211 on the information processing apparatus 40 (on the OS). However, since the data originally stored in the SD card 205 is not encrypted with the encryption key stored in the encryption module 211, the decryption of the data originally stored in the encryption module 211 produces a meaningless data sequence. Accordingly, it is necessary to perform the formatting of the SD card 205 in S64 in order to allow the data in the SD card 205 to be correctly read out.

Figure 12:
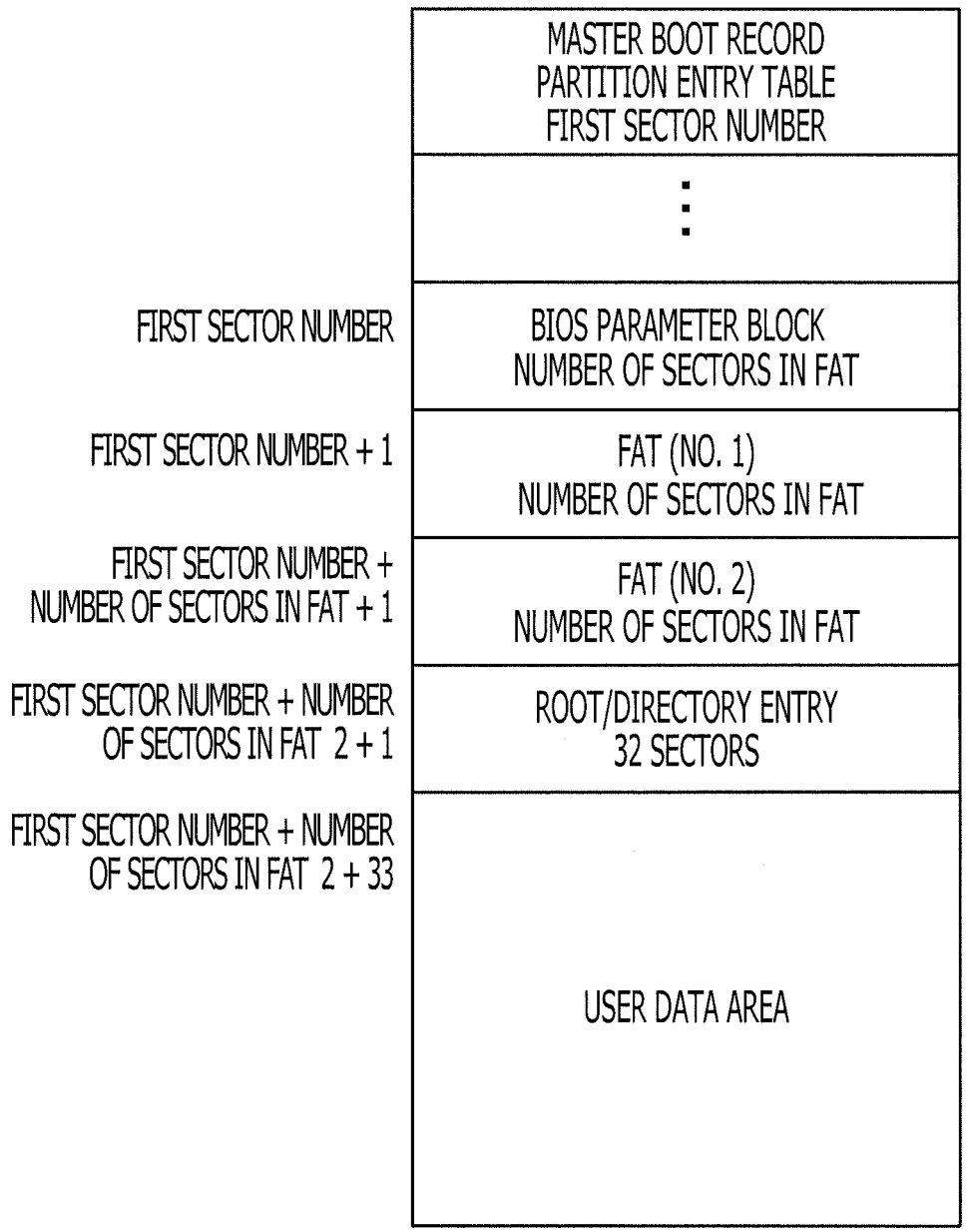
FIG. 12 illustrates the structure of FAT16, which is typical as a file system.

In S66, recording of the data on the SD card 205 by using the encryption key is started in response to a request from the information processing apparatus 40. The encryption method according to the present embodiment will now be described with reference to FIGS. 12 and 13. FIG. 12 illustrates the structure of File Allocation Table 16 (FAT16), which is typical as a file system. In this structure, writing of data into the file system is performed in units of sectors. In the information processing apparatus 40, the OS uses a command illustrated in FIG. 13 for the file system to read out or write the data described in the file system. In the present embodiment, the encryption module 211 writes the data that is encrypted in a readout-writing data area illustrated in FIG. 13 when a "write" command is specified in FIG. 13. The encryption module 211 decrypts the data in the readout-writing data area and reads out the decrypted data when a "read" command is specified in FIG. 13.

Referring back to FIG. 11, after the processing in S66 is performed, the recording by using the encryption key is continued until the SD card 205 is unloaded from the card slot 134. In S68, it is determined whether the SD card 205 is unloaded. If the determination in S68 is affirmative, the process goes to S70.

In S70, the loading-unloading detection module 213 issues a command to erase the encryption key to the encryption module 211. The encryption module 211 performs a process of erasing (deleting) the encryption key stored in the encryption module 211 on the basis of the erase command.

In the second embodiment, in addition to the suppression of leakage of the information by creating and erasing the encryption key by the encryption module 211 described above, access disabling processes similar to the ones in the first embodiment may be appropriately performed (for example, if a threshold value of the access disabling policy is exceeded). This allows the access disabling processes to be performed also at appropriate timing other than the unloading of the SD card 205.

As described above, according to the second embodiment, since the data to be written on the SD card 205 is the data encrypted by using the encryption key and the encryption key is erased at the time when the SD card 205 is unloaded from the card slot 134 of the USB adapter 100, the data on the SD card 205 cannot be read out after the SD card 205 is unloaded. Accordingly, it is possible to improve the user-friendliness of the user by allowing the SD card 205 to be removed from the USB adapter 100 while suppressing leakage of the information, as in the first embodiment.

Although the encryption key is created upon loading of the SD card 205 and the encryption key is erased upon unloading of the SD card 205 in the second embodiment, the second embodiment is not limited to the above method. For example, a new encryption key may be created upon unloading of the SD card 205 to overwrite the encryption key that is stored in the encryption module 211 with the new encryption key. Advantages similar to the ones in the second embodiment can also be achieved by this method.

Although the loading-unloading detection module 213 is provided in the second embodiment, the loading-unloading detection module 213 may not be provided. In this case, whether access from the card slot 134 to the SD card 205 is normally performed may be detected by, for example, the encryption module 211 and it may be determined that the SD card 205 is unloaded from the card slot 134 if a state in which the access is normally performed is changed to a state in which the access is not normally performed (if an access error occurs). Advantages similar to the ones in the second embodiment can also be achieved by this method. The monitoring of the normal access may be performed by another component other than the encryption module 211.

Although the formatting of the SD card 205 is automatically performed in S64 in the second embodiment, the second embodiment is not limited to this. For example, the notification that the formatting should be performed may only be given to the user.

Figure 14:
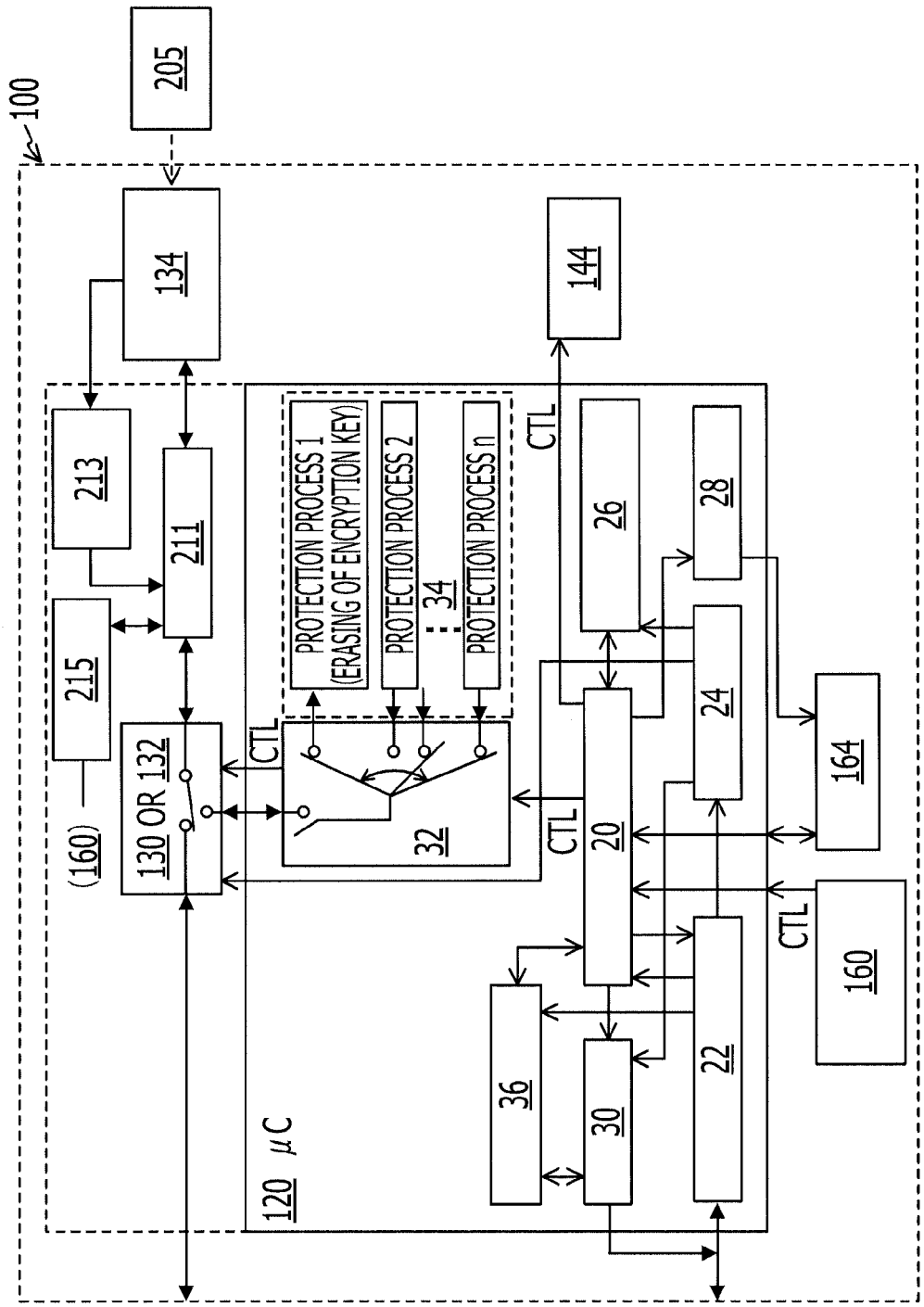
FIG. 14 is a block diagram for describing the functions of a microcomputer in a USB adapter according to a third embodiment of the present invention.

A third embodiment will now be described with reference to FIG. 14. The same reference numerals are used in the third embodiment to identify the same components in the second embodiment. A description of such components is omitted herein. In the third embodiment, as illustrated in FIG. 14, a volatile memory 215 is provided, in addition to the components in the second embodiment.

The volatile memory 215 receives power from the battery and charging circuit 160. The encryption keys created in the encryption module 211 are stored in the volatile memory 215. In a state in which the power is not supplied from the battery and charging circuit 160 to the volatile memory 215, the content of the volatile memory 215 is invalidated and the stored encryption keys are erased.

This allows advantages similar to the ones in the second embodiment to be achieved in the third embodiment. In addition, even when the battery in the battery and charging circuit 160 is abnormally unmounted to disable the access disabling process by the access disablement processor 34, the data stored in the SD card 205 cannot be read out because the encryption keys are erased. Accordingly, it is possible to suppress leakage of the information.

Figure 15:
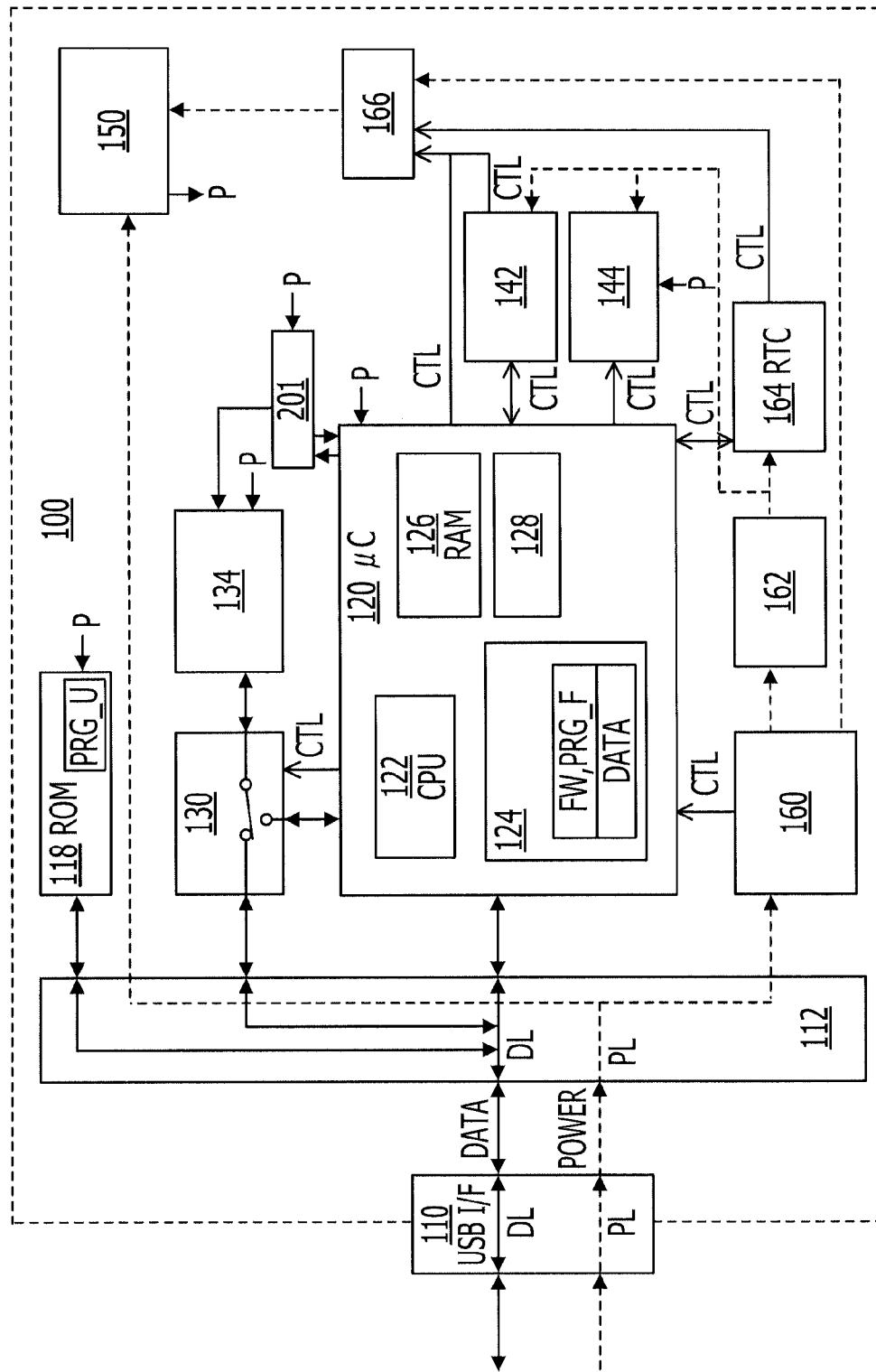
FIG. 15 is a block diagram for describing a modification of the first to third embodiments.

In the above embodiments, as illustrated in FIG. 15, an opening-closing sensor 142 including a magnetic sensor, a current sensor, a proximity switch, or the like may be provided near a part where the main body 100b is connected to or engaged with a cap 102 or a strap 104. The opening-closing sensor 142 detects that the cap 102 or the strap 104 is removed from the USB adapter 100 and that the cap 102 or the strap 104 is connected to or engaged with the USB adapter 100. The switch 166 is directly turned on or off on the basis of the result of the detection by the opening-closing sensor 142. A permanent magnet detected by the magnetic sensor, a resistor element that is connectable to the current sensor, or a proximity member that is detectable by the proximity switch may be provided in the cap 102 or the strap 104. The microcomputer 120 (the CPU 122) may monitor and control the output detected by the opening-closing sensor 142. In this case, the switch 166 is turned on or off via the microcomputer 120 (the CPU 122). The elapsed time since the closing of the cap 102 or the strap 104, detected by the opening-closing sensor 142, may be used as a factor causing the access disablement in this case. The use of the elapsed time since the physical opening or closing detected by the opening-closing sensor 142 allows the elapsed time since the user has finally opened or closed the cap 102 or the strap 104 of the USB adapter 100 to be used as a factor causing the access disablement.

Although the SD card is adopted as the portable storage medium in the above embodiments, the present invention is not limited to the use of the SD card. For example, a memory stick related product, such as a Memory Stick (registered trademark), a Memory Stick Duo (registered trademark), or a Memory Stick Micro (registered trademark), or any one of various memory cards including a mini SD card (registered trademark), a micro SD card (registered trademark), and an xD card (registered trademark) may be adopted as the portable storage medium. A card slot supporting one or multiple kinds of portable storage media may be used as the card slot 134. A USB memory or a USB-HDD may also be adopted as the portable storage medium. In this case, the card slot in each of the above embodiments is a USB connection interface.

It will be further understood by those skilled in the art that the foregoing description is of the embodiments of the present invention and that various changes and modifications may be made to the invention without departing from the spirit and scope thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable storage medium adapter connected to a computer to store data received from the computer in a portable storage medium comprising:
    a holding part that detachably holds the portable storage medium; and
    a processor configured to execute a procedure, the procedure including:
        creating an encryption key used when the computer accesses the portable storage medium;
        detecting an unloading operation of the portable storage medium by a user;
        executing a disabling process to disable external access to the data stored in the portable storage medium when the unloading operation is detected; and
        outputting a permission that releases the holding of the portable storage medium by the holding part after the disabling process is executed,
    wherein the disabling process overwrites the encryption key with a new encryption key prior to the holding of the portable storage medium being released.

2. The portable storage medium adapter according to claim 1, further comprising:
    a releasing part that releases the holding of the portable storage medium by the holding part after the disabling process is executed based on the permission.

3. The portable storage medium adapter according to claim 1,
    wherein the detecting monitors an access state of the computer to the portable storage medium to detect that the unloading operation is performed when the access state is changed from a state in which the access is normally performed to a state in which the access is not normally performed.

4. The portable storage medium adapter according to claim 1, further comprising:
    a volatile memory that stores the encryption key.

5. A method of disabling data access performed by a portable storage medium adapter connected to a computer to store data received from the computer in a portable storage medium, the method comprising:
    creating an encryption key used when the computer accesses the portable storage medium;
    detecting an unloading operation by a user for a holding part detachably holding the portable storage medium;
    executing a disabling process to disable access to the data stored in the portable storage medium when the unloading operation is detected; and
    releasing the holding of the portable storage medium by the holding part after the disabling process is executed, wherein
    the disabling process is a process of overwriting the encryption key with a new encryption key prior to the holding of the portable storage medium being released.

6. The method of disabling data access according to claim 5, further comprising:
    initializing the portable storage medium after the encryption key is created.

* * * * *